United States Patent [19]

Priddy et al.

[11] Patent Number: 4,812,530

[45] Date of Patent: Mar. 14, 1989

[54] POLYETHER-POLYCARBONATE-POLYETHER TRIBLOCK COPOLYMERS

[75] Inventors: Duane B. Priddy, Midland, Mich.; Alan Letton, Missouri City, Tex.

[73] Assignee: The Dow Chemical Company, Midland, Mich.

[21] Appl. No.: 138,265

[22] Filed: Dec. 28, 1987

[51] Int. Cl.$^4$ .............................................. C08L 71/02
[52] U.S. Cl. .................................. 525/409; 525/403; 525/462; 525/469
[58] Field of Search ..................... 525/409, 462, 469

[56] References Cited

U.S. PATENT DOCUMENTS

| | | | |
|---|---|---|---|
| 3,080,342 | 3/1963 | Lee et al. | 260/47 |
| 3,461,187 | 8/1969 | Cantrill | 260/873 |
| 3,462,515 | 8/1969 | Cantrill | 260/873 |
| 3,875,256 | 4/1975 | White | 260/860 |
| 3,991,009 | 11/1976 | Margotte et al. | 260/42.18 |
| 4,146,587 | 3/1979 | Beck et al. | 260/873 |
| 4,217,437 | 8/1980 | Schreckenberg et al. | 528/171 |
| 4,319,003 | 3/1982 | Gardlund | 525/148 |
| 4,436,839 | 3/1984 | Behnke et al. | 521/64 |
| 4,634,743 | 1/1987 | Prier | 525/462 |
| 4,657,977 | 4/1987 | Peters | 525/92 |
| 4,663,399 | 5/1987 | Peters | 525/462 |

*Primary Examiner*—Theodore E. Pertilla
*Attorney, Agent, or Firm*—Price, Heneveld, Cooper, DeWitt & Litton

[57] ABSTRACT

New polymeric compositions comprising polyether-polycarbonate-polyether triblock copolymers and a method of preparation comprising reacting a monohydroxy polyether in an organic with a carbonate precursor such as phosgene, adding the resultant mixture to a dihydric compound such as bisphenol A, water, an organic solvent and an acid acceptor, controlling the pH of the polymerizing mixture at about 11 and, after the polymerization is complete, decreasing the pH to about 8 and recovering the product.

18 Claims, No Drawings

POLYETHER-POLYCARBONATE-POLYETHER TRIBLOCK COPOLYMERS

BACKGROUND OF THE INVENTION

This invention relates to ABA triblock copolymers wherein each A segment comprises a polyether and the B block comprises a polycarbonate.

Polycarbonates are well known, commercially available resinous materials having a variety of applications. Such polycarbonates may be prepared by reacting a dihydroxy compound, such as 2,2-bis(4-hydroxyphenyl)propane with a carbonate precursor such as phosgene, in the presence of an acid bonding agent such as sodium hydroxide. The resins are tough, rigid, have high softening temperatures, good impact strength, are usable over wide temperature limits, exhibit good dimensional stability and creep resistance. They are expensive, difficult to mold and exhibit severe environmental stress crazing and cracking.

Attempts to modify the properties of the polycarbonate resins by blending with other polymeric materials have not been met with rousing success, due in no small measure to the incompatibility of polycarbonate resins with other resinous materials.

To overcome these problems, it has been proposed to polymerize resinous materials into the polycarbonate molecule. Thus, random copolymers of polycarbonates and other polymers, such as polyethers, including random, block and graft copolymers of various polymers and polycarbonate are known. While such copolymers have met with some degree of success, there remains a need for copolymeric polycarbonates wherein the admirable properties of the polycarbonate can be retained without any significant diminution in those qualities as a result of the presence of the interpolymerized other polymer.

BRIEF SUMMARY OF THE INVENTION

The present invention comprises novel ABA triblock copolymers wherein each A block comprises a polyether and the B block comprises a polycarbonate. The polyether segments of the ABA block copolymers of this invention will typically have a molecular weight in the range from about 300 to about 50,000 with the polycarbonate block typically having a molecular weight in the range from about 5,000 to 30,000. While polycarbonates prepared from a single dihydric reactant are preferred, the invention also contemplates the use of copolymeric polycarbonates which are prepared from a mixture of two or more dihydric reactants.

The polyether-polycarbonate-polyether triblock copolymers of this invention are highly crystalline materials which are useful per se as barrier films. In addition, large solubility differences exist between the polycarbonate and the polyether enabling the use of the triblock copolymers of the invention as surfactants and compatibilizers in blends of polycarbonate resins with other polymers.

DETAILED DESCRIPTION OF THE PRESENT INVENTION

The novel ABA-type triblock copolymers of this invention are prepared by adding a phosgenated organic solvent solution of monohydroxy polyether to an organic dihydroxy compound in an appropriate inert organic solvent and acid acceptor mixture in the presence of at least one carbonate precursor and a carbonate polymerization catalyst, polymerizing the mixture and recovering the product.

There can be employed in the practice of this invention substantially any monohydroxy-functional polyether. Monofunctional polyethers are prepared by the catalytic ring opening of alkaline oxides such as ethylene oxide (1,2-ethane epoxy or ethane epoxide) in the presence of a monofunctional starter compound such as ethyl alcohol, nonyl alcohol, phenol and the like.

The polyethers which can be used to form the A blocks of the triblock copolymers of this invention are monohydroxy compounds having the formula $R^1[-O-CHR^2-CR^3H-]_n-OH$; in which $R^1$ is a hydrocarbon radical having from 1 to 20 atoms and free of aliphatic unsaturation, $R^2$ and $R^3$ are independently selected from the group consisting of hydrogen, methyl and ethyl, and the sum of the carbon atoms in $R^2$ and $R^3$ is from 0 to 2, and n is a positive integer from 1 to 50. Suitable polyethers will have molecular weights in the range from 300 to 50,000, preferably 400 to 40,000 and most preferably 400–20,000. Representative examples of suitable monohydroxy polyethers are ethylene glycol methyl ether, ethylene glycol phenol ether, diethylene glycol methyl ether, propylene glycol methyl ether, dipropylene glycol n-butyl ether, ethylene glycol cyclohexyl ether, ethylene glycol nonyl ether, ethylene glycol dodecyl ether, dipropylene glycol cylcohexyl ether, tripropylene glycol t-butyl ether, tetramethylene glycol pentyl ether, tributylene glycol isopropyl ether and monohydroxy polymeric polyethers. Mixtures of these glycol ethers, for example, a mixture of propylene glycol methyl ether, dipropylene glycol methyl ether and tripropylene glycol methyl ether, can be used.

The organic dihydroxy compound is preferably a diphenol, especially an alkylidene diphenol. Representative examples of alkylidene diphenols usable as a material for making polycarbonate resins in accordance with this invention are 4,4'-isopropylidene, O-cresol, 4,4'-isopropylidene, bis(2-phenol) and 4,4'-isopropylidene bis(2,6-dichloro phenol). Other diphenols such as 4,4'-sulfoxyl diphenol and 4,4'-oxydiphenol can be used in making the ABA triblock copolymers of this invention. The organic dihydroxy compound used to make the triblock copolymers of this invention can be pure or mixtures of such compounds. Currently, bis(4-hydroxyphenyl)propane, also known as bisphenol A, is preferred.

Preferred carbonate precursor materials for use in making the triblock copolymers of this invention are selected from the group consisting of carbonyl halides, carbonyl haloformates and carbonate esters. The carbonyl halides which can be employed herein are carbonyl bromide, carbonyl chloride and mixtures thereof. Typical of the carbonate esters which may be employed are diphenyl carbonate, di-(halophenyl) carbonates such as di-(chloro phenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, or mixtures thereof. The haloformates suitable for use herein include bis-haloformates of dihydric phenols and bis-chloroformates of dihydric alcohols such as ethylene glycol, neopentyl glycol, polyethylene glycol and the like. While other carbonate precursors will occur to those skilled in the art, carbonyl chloride, also known as phosgene, is preferred.

A suitable acid acceptor may be either an organic or an inorganic acid acceptor. A suitable organic acid acceptor is a tertiary amine and includes such materials as pyridine, triethyl amine, dimethyl aniline, tributyl amine and the like. The inorganic acid acceptor may be a hydroxy, a carbonate, a bicarbonate or a phosphate of an alkali or alkali earth metal, such as sodium hydroxide. A currently preferred acid acceptor is sodium hydroxide.

The carbonate catalysts which are employed herein can be any of the suitable catalysts that aid the polymerization of dihydroxy compounds with carbonate precursors such as phosgene. Suitable catalysts include tertiary amines such as, for example, triethyl amine, tripropyl amine, N,N-methyl aniline, quaternary ammonium compounds such as tetraethylammonium bromide, cetyl triethylammonium bromide, tetra-n-heptaammonium iodide, tetra-n-propylammonium bromide, tetramethylammonium chloride, tetramethylammonium hydroxide, tetra-n-butylammonium iodide, benzyl trimethylammonium chloride and quaternary phosphonium compounds such as n-butyl triphenyl phosphonium bromide and methyl triphenyl phosphonium bromide.

It is, of course, possible to employ two or more different dihydric phenols or a copolymer of a dihydric phenol with a glycol or with hydroxy or acid terminated polyester, or with a dibasic acid to provide a carbonate copolymer or interpolymer as the B segment of the triblock copolymers of this invention. Also employed in the practice of this invention may be blends of any of the above materials to provide the carbonate polymer segment.

The triblock copolymers of this invention can be produced by conventional solution or interfacial processes known in the art for the manufacture of polycarbonates. The solution process involves reacting, for example, the monohydroxy polyether and phosgene in an appropriate solvent such as methylene chloride and contacting the phosgenated-polyether with the dihydric phenol in the presence of additional phosgene. The reaction mixture may be single organic phase employing a compatible solvent such as a halohydrocarbon, e.g., trichloromethane and utilizing a base such as pyridine or triethylamine to accept the by-product hydrogen chloride. Alternatively, interfacial polymerization techniques may be employed wherein the reaction media is composed of an organic phase and an alkaline aqueous phase. A phase transfer catalyst, that is, an acid acceptor such as triethylamine or sodium hydroxide, may be used to accept the by-product hydrogen chloride from the condensation in the organic phase and to transfer the hydrogen chloride to the alkaline aqueous phase where it is neutralized and the catalyst is regenerated to its unprotonated form to accept additional hydrogen chloride.

The solution and interfacial polymerization techniques known in the art for the manufacture of carbonates can be applied equally in the practice of the instant invention, as more fully set forth in the examples.

Any conventional organic solvent that will solvate the product polymer may be used in the process of the instant invention, so long as the solvent is chemically unreactive in the polycarbonate polymerization. A preferred group of solvents is the chlorinated aliphatic hydrocarbons of 1–4 carbons such as dichloromethane, chloroform, carbon tetrachloride, dichloroethane, trichloroethane, trichloroethylene, tritetrachloroethylene and mixtures thereof. Another desirbble class of solvents is the optionally halogenated aromatic hydrocarbons such as monochlorobenzene, dichlorobenzene and mixtures thereof. Preferred solvents are the chloromethanes and especially dichloromethanes. The solvents used in a solution polymerization process are preferably water free so as to avoid side reactions.

The interfacial process utilizes an organic phase and an aqueous phase. In carrying out the interfacial process, it is important that the organic solvent chosen be immiscible with water. The quantity of organic solvent and the concentration of the reactants in the solvent are not critical except that sufficient solvent should be present to dissolve the product polymer and the organic carbonate precursors such as phosgene should be present in an amount sufficient to form the polycarbonates of the presen invention. An amount of organic solvent sufficient to form a product polymer solution of about 20 weight percent polymer is generally the minimum amount of solvent. The organic phase carbonate precursor such as phosgene generally should be present in stoichiometric amounts with respect to the amount of hydroxyl functionality present in both the monohydroxy polyether and the dihydric phenol.

The aqueous phase is normally basic to the extent of a pH of at least about 8 and preferably at least about 9 prior to reaction. During reaction, the pH may vary within the range of about 7 to 12, but preferably is kept above 7 by the addition of base such a sodium hydroxide when needed.

The dihydric carbonate forming reactants, in an interfacial polymerization reaction, are provided in the aqueous phase and when neutralized with the base are referred to the organic phase as bisphenolates. These reactants are normally formed by dissolving the bisphenols in water with an inorganic base, such as an alkali or alkaline earth hydroxide, preferably an alkaline metal hydroxide, and most preferably, sodium hydroxide. The concentrations of the bisphenolates in the aqueous phase are not critical except that the aqueous phase bisphenolate should be present in an amount sufficient to form the triblock copolymers of the present invention. The aqueous phase bisphenolates generally should be present in stoicheometric amounts with respect to the phosgenated polyether and the added carbonate precursor such as phosgene. Other materials which do not adversely affect the polymerization reaction may be present in the aqueous phase in addition to the bisphenolates and excess base, such as antioxidants, foam depressants and catalysts.

The process for making the polycarbonates, whether by solution polymerization or by interfacial polymerization, may be carried out at ambient temperatures, such as typical room temperature condition, i.e., 23° to 25° C. Higher and lower temperatures may be employed, taking into consideration the problems of stabilizing an interfacial polymerization at temperatures above or below ambient temperatures. The solution process allows the use of a wide temperature range, no particular temperature being absolutely critical to the practice of the process of the invention. Pressure is not critical so superatmospheric or subatmospheric pressures can be used as well as atmospheric pressure. Reaction time can vary from minutes to as long as several hours.

The example which follows is intended solely to illustrate this invention and is not intended in any way to limit the scope and intent of this invention.

EXAMPLE 1

Preparation of Polyethylene Glycol-Bisphenol A Polycarbonate-Polyethylene Glycol Triblock Carbonate Nonylphenol initiated polyethylene oxide having a weight average molecular weight of 450 (25 grams) was placed in a 2 liter flask along with 1 liter of methylene chloride. Phosgene (30 grams) was added to the mixture followed by 9 cc of triethylamine. After stirring at ambient conditions for 10 minutes, the mixture was washed with 500 milliliters of water.

To a second 5 liter flask equipped with a mechanical stirrer, gas tube, thermometer, caustic addition and a vent through a caustic scrubber was added 275 grams of bisphenol A, (bis[4-hydroxyphenyl]propane), 1500 cc of water and 500 cc of methylene chloride. The mixture was sparged with nitrogen for 5 minutes followed by the addition of 100 grams of 50% aqueous sodium hydroxide. The mixture was cooled at 25°±2° C. with an ice water bath while the methylene chloride solution of phosgenated polyethylen oxide was added over 2 minutes. After the addition was complete, phosgene was added at 5 grams per minute and 50% sodium hydroxide solution at 9 grams per minute. After 23 minutes, 200 grams of 50% sodium hydroxide and 140 grams of phosgene had been added. At this point, 75 grams of 50% sodium hydroxide solution and 2 cc of triethylamine were added all at once. After stirring for 10 minutes, the brine layer was decanted from the polymerization flask and the organic layer washed with water until free of electrolytes. The polymer was isolated by mixing the methylene chloride solution with twice its volume of acetone in a Waring blender. The powder was separated by filtration and dried in a vacuum oven. Small angle light scattering analysis of the product showed the material to have a crystallinity of 40%. DSC evaluation found melting points at 200° C. and 240° C. The indicated crystalline nature of the product is surprising since polycarbonates are known to be amorphous polymers.

The triblock products of the present invention exhibit first a high degree of crystallinity, as contrasted with less crystalline polyalkylene oxide/polycarbonate multiblock copolymers. This renders them useful as films due to their high barrier resistant properties. Due to the large solubility parameter differences between polycarbonates and polyethers, such as polyethylene oxide, these materials may also act as surfactants or as compatibilizers in blends of polycarbonates with other polymers.

It is understood that the above is merely a preferred embodiment and that various changes and alterations can be made without departing from the spirit and broader aspects of the invention.

The embodiments of the invention in which an exclusive property or privilege is claimed are defined as follows:

1. A triblock copolymer of the ABA type wherein the A segments comprise monohydroxy polyethers having the formula $R^1(-O-CHR^2-CR^3H)_nOH$ wherein $R^1$ is a hydrocarbon radical having form 1 to 20 carbon atoms and free of aliphatic unsaturation, $R^2$ and $R^3$ are independently hydrogen, methyl and eithyl and the sum of the carbon atoms in $R^2$ and $R^3$ is from 0 to 2, and n is 1 to 50 and the B segments comprises polycarbonates.

2. A triblock copolymer in accordance with claim 1 wherein said polyether comprises polyethylene monoglycol ether.

3. A triblock copolymer in accordance with claim 1 wherein said polycarbonate comprises bis(4-hydroxyphenyl)-propane.

4. A triblock copolymer in accordance with claim 1 wherein said polyether has a molecular weight in the rang from 300 to 50,000 and said polycarbonate has a molecular eight in the range from 5,000 to 30,000.

5. A triblock copolymer in accordance with claim 4 wherein said polyether comprises polyethylene monoglycol ether.

6. A triblock copolymer in accordance with claim 4 wherein said polycarbonate comprises bis(4-hydroxyphenyl)propane.

7. A triblock copolymer in accordance with claim 6 wherein said polyether comprises polyethylene monoglycol ether.

8. A triblock copolymer in accordance with claim 1 wherein said polycarbonate comprises a copolycarbonate formed from at least two different polyhydroxy compounds, one of said polyhydroxy compounds being bis(4-hydroxyphenyl) propane.

9. A triblock copolymer in accordance with claim 8 wherein said polyether comprises polyethylene monoglycol ether.

10. A triblock copolymer in accordance with claim 8 wherein said polyether has a molecular weight in the range from 300 to 50,000 and said polycarbonate has a molecular weight in the range from 5,000 to 30,000.

11. A triblock copolymer in accordance with claim 10 wherein said polyether comprises polyethylene monoglycol ether.

12. A method for preparing the ABA-type triblock copolymer comprising:
   (a) contacting at least one monohydroxy polyether having the formula $R^1(-O-CHR^2-CR^3H-)_n-OH$; wherein $R^1$ is a hydrocarbon radical having from 1 to 20 carbon atoms and free of aliphatic unsaturation, $R^2$ and $R^3$ are independently hydrogen, methyl and ethyl, and the sum of the carbon atoms in $R^2$ and $R^3$ is from 0 to 2, and n is 1 to 50 with at least one carbonate prcursor material to form a reaction mixture;
   (b) contacting the reaction mixture of (a) with at least one dihydroxy compound in the presence of at least one carbonate precursor material and at least one acid acceptor; and
   (c) recovering the product ABA-type triblock copolymer.

13. A method in accordance with claim 12 wherein said carbonate precursor material comprises carbonyl chloride.

14. A method in accordance with claim 13 wherein said acid acceptor comprises sodium hydroxide.

15. A method in accordance with claim 14 wherein said carbonate precursor comprises carbonyl chloride.

16. A method in accordance with claim 12 wherein said monohydroxy polyether comprises polyethylene monohydroxy glycol ether, said carbonate precursor material comprises carbonyl chloride, said dihydroxy compound comprises bis(4-hydroxyphenyl)propane and said acid acceptor comprises sodium hydroxide.

17. A method in accordance with claim 12 wherein said dihydroxy compound comprises a mixture of at least two dihydroxy compounds, one of said compounds being bis(4-hydroxyphenyl)propane.

18. A method in accordance with claim 17 wherein said monohydroxy polyether comprises polyethylene monohydroxy glycol ether, said carbonate precursor material comprises carbonyl chloride and said acid acceptor comprises sodium hydroxide.

* * * * *

UNITED STATES PATENT AND TRADEMARK OFFICE
CERTIFICATE OF CORRECTION

PATENT NO. : 4,812,530
DATED : March 14, 1989
INVENTOR(S) : Duane B. Priddy and Alan Letton It is certified that error appears in the above-identified patent and that said Letters Patent is hereby corrected as shown below:

Column 2, line 14, following " 1 to 20" insert therefor --carbon--.

Column 2, line 27, "cylcohexyl" should read --cyclohexyl--.

Column 3, line 44, following the word "be" insert therefor --a--.

Column 4, line 3, "desirbble" should read --desirable--.

Column 4, line 19, "presen" should read --present--.

Column 4, line 32, "a" should read --as--.

Column 5, line 17, following the word "gas" insert therefor --inlet--.

UNITED STATES PATENT AND TRADEMARK OFFICE
CERTIFICATE OF CORRECTION

PATENT NO. : 4,812,530

DATED : March 14, 1989

INVENTOR(S) : Duane B. Priddy and Alan Letton

It is certified that error appears in the above-identified patent and that said Letters Patent is hereby corrected as shown below:

Column 5, line 25, "polyethylen" should read --polyethylene--.

Column 5, line 65, "form" should read --from--.

Column 5, line 67, "eithyl" should read --ethyl--.

Column 6, line 1, "comprises" should read --comprise--.

Column 6, line 11, "rang" should read --range--.

Column 6, line 12, "eight" should read --weight--.

Column 6, line 48, "prcursor" should read --precursor--.

Signed and Sealed this

Second Day of January, 1990

*Attest:*

JEFFREY M. SAMUELS

*Attesting Officer*      *Acting Commissioner of Patents and Trademarks*